United States Patent
Park et al.

(10) Patent No.: US 10,868,889 B2
(45) Date of Patent: Dec. 15, 2020

(54) SYSTEM FOR PROVIDING GAME PLAY VIDEO BY USING CLOUD COMPUTER

(71) Applicant: MINKONET CORPORATION, Seoul (KR)

(72) Inventors: Kyung Soo Park, Gyeonggi-do (KR); Tae Woo Kim, Gyeonggi-do (KR); Dong Hwal Lee, Seoul (KR)

(73) Assignee: MINKONET CORPORATION, Seoul (KR)

( * ) Notice: Subject to any disclaimer, the term of this patent is extended or adjusted under 35 U.S.C. 154(b) by 0 days.

(21) Appl. No.: 16/595,479

(22) Filed: Oct. 8, 2019

(65) Prior Publication Data

US 2020/0120187 A1  Apr. 16, 2020

(30) Foreign Application Priority Data

Oct. 10, 2018 (KR) .......... 10-2018-0120296

(51) Int. Cl.
*H04L 29/06* (2006.01)
*A63F 13/211* (2014.01)
*G06T 19/00* (2011.01)
*A63F 13/55* (2014.01)
*A63F 13/30* (2014.01)

(52) U.S. Cl.
CPC ............ *H04L 67/38* (2013.01); *A63F 13/211* (2014.09); *A63F 13/30* (2014.09); *A63F 13/55* (2014.09); *G06T 19/003* (2013.01); *G06T 19/006* (2013.01)

(58) Field of Classification Search
CPC ..... G06F 3/011; G06T 15/005; G06T 19/003; G06T 15/205; G06T 15/20; G06T 19/20; G06T 2200/16; G06T 19/006; H04N 19/176; H04N 13/117; H04N 13/161; H04N 19/124; H04N 21/2187; A63F 13/335; A63F 13/86; A63F 13/211; A63F 13/30; A63F 15/55
See application file for complete search history.

(56) References Cited

U.S. PATENT DOCUMENTS

| | | | |
|---|---|---|---|
| 9,180,369 B2* | 11/2015 | Willis | ............ G06Q 30/02 |
| 10,218,976 B2* | 2/2019 | Thiagarajan | ......... H04N 19/176 |
| 2008/0119286 A1* | 5/2008 | Brunstetter | ............. A63F 13/00 463/43 |
| 2011/0022959 A1* | 1/2011 | Troy | ................... G06F 16/4393 715/720 |
| 2011/0088071 A1* | 4/2011 | Yerli | ..................... A63F 13/352 725/109 |
| 2013/0163960 A1* | 6/2013 | Abecassis | .......... H04N 21/4622 386/244 |

(Continued)

*Primary Examiner* — Ninos Donabed
(74) *Attorney, Agent, or Firm* — JCIPRNET

(57) ABSTRACT

Provided is a system for providing a game play video by using a cloud computer, and more particularly, to a system for providing a game play video to a user by rendering the game play video by using a cloud computer connected to a user terminal.
According to the system for providing a game play video by using a cloud computer, a game play video may also be watched using a low-specification terminal, and there is no need to install a game on a terminal.
According to the system for providing a game play video by using a cloud computer, a user may intervene, in real time, in a game that is being played, and watch a game play video using various methods.

1 Claim, 1 Drawing Sheet

(56) References Cited

U.S. PATENT DOCUMENTS

| | | | | |
|---|---|---|---|---|
| 2013/0215115 A1* | 8/2013 | Jenkins | G06T 15/20 | 345/420 |
| 2013/0251337 A1* | 9/2013 | Abecassis | H04N 21/47815 | 386/239 |
| 2013/0251338 A1* | 9/2013 | Abecassis | H04N 21/4755 | 386/241 |
| 2013/0343720 A1* | 12/2013 | Abecassis | G11B 27/10 | 386/239 |
| 2014/0080110 A1* | 3/2014 | Nguyen | G09B 7/00 | 434/362 |
| 2014/0210855 A1* | 7/2014 | Cohen | G06F 16/44 | 345/633 |
| 2014/0219630 A1* | 8/2014 | Minder | H04N 21/8549 | 386/241 |
| 2015/0037003 A1* | 2/2015 | Fastige | H04N 21/45457 | 386/241 |
| 2015/0037004 A1* | 2/2015 | Minder | H04N 5/783 | 386/241 |
| 2015/0037005 A1* | 2/2015 | Tapper | H04N 9/8205 | 386/241 |
| 2015/0037006 A1* | 2/2015 | Tapper | H04N 9/8042 | 386/241 |
| 2015/0086173 A1* | 3/2015 | Abecassis | H04N 21/8126 | 386/201 |
| 2015/0086174 A1* | 3/2015 | Abecassis | H04N 21/4307 | 386/201 |
| 2015/0110457 A1* | 4/2015 | Abecassis | H04N 21/4394 | 386/201 |
| 2015/0170325 A1* | 6/2015 | Abecassis | G11B 27/28 | 345/2.1 |
| 2015/0306497 A1* | 10/2015 | Sampson | A63F 13/23 | 463/42 |
| 2015/0319493 A1* | 11/2015 | Lynch | H04N 21/47815 | 725/42 |
| 2018/0084253 A1* | 3/2018 | Thiagarajan | H04N 19/44 | |
| 2018/0084279 A1* | 3/2018 | Thiagarajan | H04N 19/126 | |
| 2018/0084280 A1* | 3/2018 | Thiagarajan | H04N 19/91 | |
| 2018/0192081 A1* | 7/2018 | Huang | H04N 13/117 | |
| 2018/0309991 A1* | 10/2018 | Thiagarajan | H04N 19/124 | |
| 2019/0366210 A1* | 12/2019 | Beltran | A63F 13/355 | |
| 2019/0370926 A1* | 12/2019 | Hagland | G06T 19/00 | |
| 2020/0120187 A1* | 4/2020 | Park | G06T 19/006 | |

\* cited by examiner

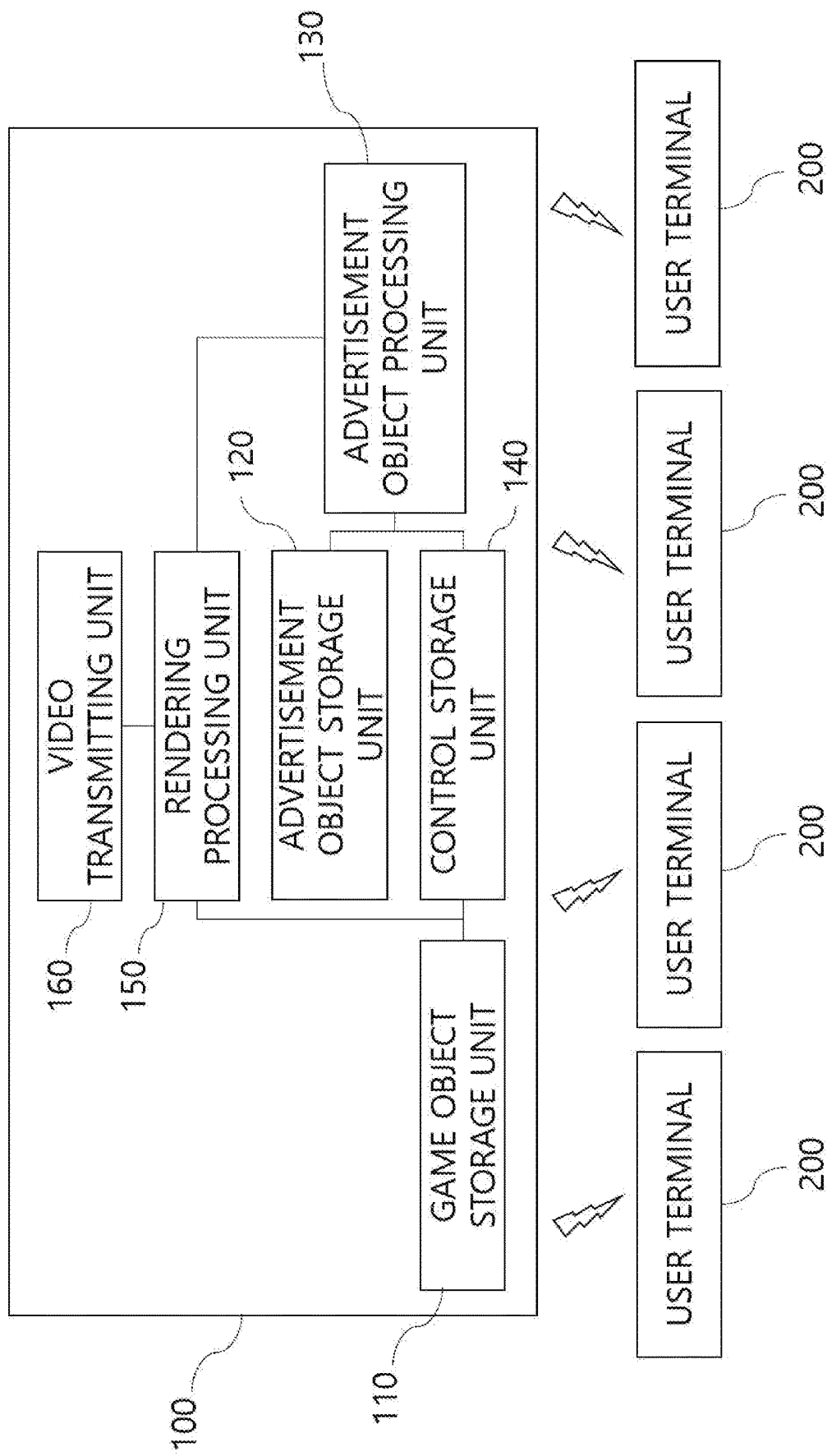

SYSTEM FOR PROVIDING GAME PLAY VIDEO BY USING CLOUD COMPUTER

CROSS-REFERENCE TO RELATED APPLICATION

This application claims the benefit of Korean Patent Application No. 10-2018-0120296, filed on Oct. 10, 2018, in the Korean Intellectual Property Office, the disclosure of which is incorporated herein in its entirety by reference.

BACKGROUND

1. Field

One or more embodiments relate to a system for providing a game play video by using a cloud computer, and more particularly, to a system for providing a game play video to a user by using a cloud computer connected to a user terminal.

2. Description of the Related Art

Recently, video service providing systems such as YouTube have allowed users to search for and replay videos of various fields. Also, smartphones, tablets, etc. have been popularized, games that can be enjoyed not only on a personal computer or game terminals but also on mobile devices are increasing, and users using these games are also increasing. In line with this, more and more users enjoy games by uploading their game play videos to a video service or by watching videos uploaded by other users.

As a method of providing a video, instead of providing a video itself provided in units of image frames, recently, a method of providing movement information of objects appearing in a game, over time, as scripts and directly rendering a video on a terminal used to view the video has been tried.

The above-described video providing method may be an efficient method considering the capacity of a video and the internet speed. However, the method has the drawbacks that a game has to be installed directly on a terminal used to view videos and a high-performance terminal capable of rendering the videos is required. In addition, a lot of power is consumed in the process of rendering videos, and thus there is limitation in the replay time with the limited battery power of a mobile terminal.

Recently, more and more users enjoy games in various custom modes by adding game resource files which are not produced by game manufacturers. To provide a video by using the above-described method, there is the burden of having to additionally add game resource files to each terminal to be used to watch a video.

Meanwhile, among users who watch a game video, the demand for watching a video by directly intervening in a game or watching a game video by changing, in real time, a viewpoint from which the game is being played, is rapidly increasing, instead of just passively watching a video.

SUMMARY

One or more embodiments include a system for providing a game play video by using a cloud computer, whereby a game play video is easily reproduced even using a low-specification terminal and an active watching of the game play video is allowed, by using a cloud computer, without having to install a game on a user terminal.

Additional aspects will be set forth in part in the description which follows and, in part, will be apparent from the description, or may be learned by practice of the presented embodiments.

According to one or more embodiments, a system for providing a game play video by using a cloud computer, wherein the system provides a game play video of a player to a user terminal by using a cloud computer, and includes: a game object storage unit storing, as game object information, shape information of a game object including characters, props or backgrounds constituting a video of a game; a control storage unit storing, as control input information, information including player selection information or viewpoint change information transmitted from the user terminal; a rendering processing unit rendering a game play video by using the game object information stored in the game object storage unit and the control input information stored in the control storage unit; and a video transmitting unit transmitting the game play video rendered using the rendering processing unit, to the user terminal.

BRIEF DESCRIPTION OF THE DRAWINGS

These and/or other aspects will become apparent and more readily appreciated from the following description of the embodiments, taken in conjunction with the accompanying drawing in which:

FIG. 1 is a block diagram for describing a system for providing a game play video by using a cloud computer, according to an embodiment of the present disclosure.

DETAILED DESCRIPTION

Hereinafter, a system for generating a game play video by using a cloud computer, according to an embodiment of the present disclosure, will be described in detail with reference to the attached drawings.

FIG. 1 is a block diagram for describing a system for providing a game play video by using a cloud computer, according to an embodiment of the present disclosure.

A cloud computer 100 described in the present embodiment is an apparatus connected to a network and performing computer operation. The cloud computer 100 receives an operation instruction from a user terminal 200 connected to a network and transmits a result of the operation back to the user terminal 200. The cloud computer 100 may be configured in a structure in which multiple central processing units (CPU) and graphics processing units (GPU) are connected in parallel to perform game play and video rendering.

The user terminal 200 to which the system for providing a game play video by using a cloud computer, according to the present embodiment, is provided, may include a network device capable of accessing the cloud computer 100 and a screen and an input device for displaying a game play video. Representative examples of the user terminal 200 may be a smartphone or a tablet personal computer (PC). A desktop computer or a laptop computer may also be the user terminal 200. According to circumstances, a game console or a mobile game player may also be the user terminal 200 according to the present embodiment. As described above, since complicated operation is conducted by the cloud computer 100, the user terminal 200 does not have to conduct complicated operation. Thus, a user terminal 200 of low specifications may also be used in the system for providing a game play video by using a cloud computer, according to the present embodiment. In addition, game resource files for executing a game are also stored in the cloud computer 100, and thus, the user terminal 200 needs not additionally store resource files.

A player refers to a person who actually plays a game. A player may also play a game by using the game resource files stored in the cloud computer 100 by using the cloud computer 100 and game object information stored in a game object storage unit 110. A user refers to a person who watches a game of a player. Taking platforms such as Twitch, YouTube, or Africa, as an example, a player corresponds to a streamer who plays a game, and a user is a person who watches the game played by the streamer. In the case of a game TV channel specialized in game broadcasts, for example, a player is a person who professionally plays a game, and a user is a viewer watching the game TV channel.

The game object storage unit 110 stores game object information. Game object information refers to shape information of a game object such as characters, props, backgrounds or the like, that constitute a game. Game object information is typically provided as three-dimensional mesh-type data by using a game development tool. In general, such game object information is stored in a storage unit of a terminal in which a game is installed. As described above, game object information of the system for providing a game play video by using a cloud computer, according to the present embodiment, is provided using the game object storage unit 110 of the cloud computer 100, and thus, a user does not need to install a game on the user terminal 200 directly.

A control storage unit 140 stores control input information. Control input information refers to, for example, player selection information or viewpoint change information transmitted by the user terminal 200. The control input information is input by a user via an input device of the user terminal 200. The control storage unit 140 stores control input information transmitted from the user terminal 200 via network connection. Player selection information refers to an input of selecting a particular player in a game in which multiple players participate simultaneously. Viewpoint change information refers to movement information of a virtual camera, which is to display a game play screen. A viewpoint may be changed to a first person or a third person according to user's selection. Moreover, an input of freely moving the virtual camera displaying the game play screen may also be included in the viewpoint change information. In this case, a game play situation may be viewed from various angles.

An advertisement object storage unit 120 stores shape information of advertisement objects inserted into a game play video, as advertisement object information. Advertisement object information includes various types of information. Not only visual advertisement objects in the form of characters, numbers, and a three-dimensional mesh, acoustic advertisement objects such as sound are also included in advertisement object information of the system for providing a game play video by using a cloud computer, according to the present embodiment.

An advertisement object processing unit 130 selects advertisement object information of a particular advertisement object from advertisement object information stored in the advertisement object storage unit 120 and stores the same as selected advertisement object information. The advertisement object processing unit 130 may select an advertisement object by using various methods and store the advertisement object as selected advertisement object information. In the present embodiment, the advertisement object processing unit 130 selects an advertisement object according to control input information stored in the control storage unit 140 and stores the advertisement object as selected advertisement object information.

A rendering processing unit 150 renders a game play video by using game object information stored in the game object storage unit 110 and control input information stored in the control storage unit 140. A game play video rendered using the rendering processing unit 150 may be a video that is output by rendering a game played by a player in real time or a game replay video that is output by rendering a game played by a player in the past.

In addition, the rendering processing unit 150 may render a game play video by adding selected advertisement object information stored in the advertisement object processing unit 130 as needed. Selected advertisement objects may be expressed in a game play video by using various methods. The rendering processing unit 150 may perform rendering such that advertisement objects are simply separately displayed on a game screen. According to circumstances, a game play video may be rendered such that a part of the outer appearance of a game object is replaced by an advertisement object or the entire game object is replaced by an advertisement object. Rendering may also be performed such that a game object and an advertisement object interact with each other. For example, rendering may be performed by adding an advertisement object to a game play video such that the appearance of a particular advertisement object changes as a game character contacts the advertisement object or the appearance of a game character that came into contact with an advertisement object changes.

A video transmitting unit 160 transmits the game play video rendered using the rendering processing unit 150 to the user terminal 200.

Hereinafter, a process of providing a game play video by using the system for providing a game play video by using a cloud computer, according to the present embodiment, configured as described above, will be described.

When a player plays a game in real time or a video of a played game is uploaded to the cloud computer 100, a user accesses the cloud computer 100 via the user terminal 200. As described above, a player may be a streamer who plays a game on a platform such as a Twitch. YouTube, or Africa or a professional game player playing a game on a game TV channel.

While a user is watching a game play video by using the user terminal 200, the user terminal 200 receives, from the user, control input information such as player selection information, viewpoint change information or the like, by using an input device. The control input information input to the user terminal 200 as described above is stored in the control storage unit 140 of the cloud computer 100 that is connected to the user terminal 200 through a network. The rendering processing unit 150 performs rendering of a game play video by adding the above-described control input information. When the rendering processing unit 150 renders the game play video, the video transmitting unit 160 transmits the rendered game play video to the user terminal 200. The user terminal 200 receives the game play video and displays the same on a screen. Thus, the user may watch the game play video.

When the user selects a player who the user wants to watch, the rendering processing unit 150 renders, on a game play screen of the selected player, the game play video by using the control input information stored in the control storage unit 140. That is, while a player is playing a game in real time, the user may view a game play screen of a particular player as a game play video.

Also, while the game is being played, the user may view a game play video from a desired viewpoint. The user inputs viewpoint change information via the user terminal 200. The viewpoint change information may be input by using various input devices such as a keyboard, a mouse, a gamepad, or the like connected to the user terminal 200. When viewpoint change information is input as described above, the control storage unit 140 stores control input information. The rendering processing unit 150 generates a game play video from a particular viewpoint by using the control input information stored in the control storage unit 140. As the above-described process is performed in real time, the user may watch the game play video not only from a fixed viewpoint but also by moving the viewpoint.

As described above, according to the system for providing a game play video by using a cloud computer, according to the present embodiment, a game played by a player in real time is provided as a game play video by using various methods that suit a user's preference. Unlike passive watching of a game play video according to the related art, the above-described service allows a user to actively participate in a game by using the user terminal 200 of the user. Accordingly, an interesting game play video may be provided to a user by using the system for providing a game play video by using a cloud computer, according to the present embodiment.

Meanwhile, a game played by a player operates based on game object information stored in the game object storage unit 110. In addition, a game play video provided to a user is also a video rendered by the rendering processing unit 150 by using the game object information stored in the game object storage unit 110. That is, a player and a user may play a game or render a video by using the same game object information. Certain games may include not only basic game resource files or game object information but also resource files or game object information that are processed by users or newly created, and may be occasionally played in a custom mode. According to the system for providing a game play video by using a cloud computer, according to the present embodiment, a player and a user play a game or render a video by using the same game resource files and the same game object information, as described above, and thus, even when the player uses other files than resource files included in a basic game, a game play video may be rendered normally. Thus, a user who wants to watch a game play video does not need to search for and add resources files added by a player and thus may efficiently use a service.

Furthermore, complicated rendering to generate a game play video is directly executed on the cloud computer 100 as described above. Accordingly, a user may view a game play video provided by the system for providing a game play video by using a cloud computer, according to the present embodiment, by using a low specification-terminal. That is, regardless of the type of the user terminal 200, the user may actively watch a game play video by using various devices in various environments.

Next, a process of providing a game play video to which an advertisement object is added will be described.

As described above, shape information of an advertisement object is stored in the advertisement object storage unit 120 as advertisement object information. In addition, the advertisement object processing unit 130 stores advertisement object information regarding a particular advertisement object according to control input information stored in the control storage unit 140, as selected advertisement object information. As described above, when the advertisement object processing unit 130 stores selected advertisement object information, the rendering processing unit 150 renders a game play video, into which an advertisement object is inserted by adding the selected advertisement object information.

As described above, when a user selects a certain player via the user terminal 200, the control storage unit 140 stores control input information input to the user terminal 200. The advertisement object processing unit 130 selects an advertisement based on player selection information included in the control input information. The advertisement object processing unit 130 stores an advertisement object provided by a company sponsoring a selected player as selected advertisement object information. When the rendering processing unit 150 renders a game play video based on the selected advertisement object information, an advertisement of the company sponsoring the selected player is displayed in the game play video.

As described above, according to the system for providing a game play video by using a cloud computer, according to the present embodiment, an advertisement may be selected by using control input information input by a user and the selected advertisement may be included in a game play video, thereby maximizing advertising effects. Users watching a game play of a certain player are exposed to advertisement of a company which sponsors that player. Thus, there is also the effect of encouraging players and companies to use the system for providing a game play video by using a cloud computer, according to the present embodiment.

While the present disclosure has been described with reference to preferred embodiments, the scope of the present disclosure is not limited to the above described and illustrated structures.

For example, a rendering processing unit may render a game play video as a virtual reality (VR)-type video. In this case, as a game play video is provided in a VR form, a user may watch the game play video in a VR environment by using a VR viewing device of the user.

Also, control input information stored in a control storage unit may include game playing information needed for a game play. In this case, a user may not only simply view a game play video but may also play a game. Game playing information refers to information that is input when a user manipulates a character or the like appearing in a game, by using an input device of a user terminal. The control storage unit stores, as control input information, game playing information input to a user terminal. A cloud computer conducts operation regarding a movement of an object appearing in a game or a change in the object, by using the control input information stored in the control storage unit. A rendering processing unit renders a game play video by using a result of operation conducted in a cloud computer. The rendered game play video is transmitted to a user terminal via a video transmitting unit. As described above, as the series of processes are performed in real time, a user may also play a game by using the user terminal. According to this method, the user may directly intervene in a game played by a player. In addition, the user may continuously play a game after a game player, and may resume a game play that has been played, based on the stored game play video.

In addition, while the advertisement object processing unit 130 is described above as storing selected advertisement object information by using control input information stored in the control storage unit 140, the advertisement object processing unit 130 may be omitted. In this case, the rendering processing unit renders a game play video by using advertisement object information stored in the advertisement object storage unit. That is, all advertisement objects stored in the advertisement object storage unit are displayed in the game play video.

In addition, while the advertisement object processing unit 130 is described above as selecting an advertisement based on player selection information, methods, whereby an advertisement object processing unit selects an advertisement, may be modified in various manners.

Also, while the cloud computer 100 is described above as including the advertisement object storage unit 120 and the advertisement object processing unit 130 to insert an advertisement object into a game play video, a system for providing a game play video by using a cloud computer, according to the present disclosure, may also be configured by omitting both the advertisement object storage unit 120 and the advertisement object processing unit 130.

According to the system for providing a game play video by using a cloud computer, according to the present disclosure, a game play video may also be viewed on a low-specification terminal, and there is no need to install a game on a terminal.

According to the system for providing a game play video by using a cloud computer, according to the present disclosure, a user may intervene, in real time, in a game that is being played, and may watch a game play video by using various methods.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the FIGURES, it will be understood by those of ordinary skill in the art that various changes in form and details may be made therein without departing from the spirit and scope of the present disclosure as defined by the following claims.

What is claimed is:

1. A system for providing a game play video by using a cloud computer, wherein the system provides a game play video of a player to a user terminal by using a cloud computer, the system comprising:

a game object storage unit storing, as game object information, shape information of a game object comprising characters, props and backgrounds constituting a game;

a control storage unit storing, as control input information, information comprising player selection information and viewpoint change information transmitted from the user terminal, wherein the control storage unit further stores game playing information transmitted from the user terminal, in the control input information, such that the user is able to directly intervene in a game play;

a rendering processing unit rendering a game play video by using the game object information stored in the game object storage unit and the control input information stored in the control storage unit;

a video transmitting unit transmitting the game play video rendered using the rendering processing unit, to the user terminal;

an advertisement object storage unit storing, as advertisement object information, shape information of an advertisement object to insert an advertisement into the game play video;

an advertisement object processing unit storing, as selected advertisement object information, advertisement object information regarding a particular advertisement object from among the advertisement object information stored in the advertisement object storage unit according to the control input information stored in the control storage unit, wherein the advertisement object processing unit stores, as the selected advertisement object information, advertisement object information regarding an advertisement object sponsoring a particular player by using player selection information from among the control input information stored in the control storage unit, wherein the rendering processing unit renders a game play video as a virtual reality (VR)-type image by adding the selected advertisement object information stored in the advertisement object processing unit and the advertisement object information stored in the advertisement object storage unit.

\* \* \* \* \*